US009024470B2

(12) United States Patent
Roebke

(10) Patent No.: US 9,024,470 B2
(45) Date of Patent: May 5, 2015

(54) DIMMABLE LED READING LIGHT UNIT, ARRANGEMENT OF POWER SUPPLY AND DIMMABLE LED READING LIGHT UNIT, METHOD OF OPERATING A DIMMABLE LED READING LIGHT UNIT IN A POWER SUPPLY SYSTEM AND METHOD OF REPLACING A DIMMABLE LIGHT UNIT BY A DIMMABLE LED READING LIGHT UNIT

(71) Applicant: Goodrich Lighting Systems GmbH, Lippstadt (DE)

(72) Inventor: Steffen Roebke, Paderborn (DE)

(73) Assignee: Goodrich Lighting Systems GmbH (DE)

( * ) Notice: Subject to any disclaimer, the term of this patent is extended or adjusted under 35 U.S.C. 154(b) by 0 days.

(21) Appl. No.: 14/199,278

(22) Filed: Mar. 6, 2014

(65) Prior Publication Data

US 2014/0252951 A1   Sep. 11, 2014

(30) Foreign Application Priority Data

Mar. 6, 2013   (EP) ..................... 13157947

(51) Int. Cl.
*B60L 1/14*   (2006.01)
*B60Q 3/00*   (2006.01)
*H05B 33/08*  (2006.01)
*B60Q 3/02*   (2006.01)

(52) U.S. Cl.
CPC ............. *B60Q 3/00* (2013.01); *H05B 33/0848* (2013.01); *B60Q 3/0253* (2013.01); *H05B 33/0812* (2013.01)

(58) Field of Classification Search
USPC .................. 315/77, 291, 308; 307/10.1, 10.8
See application file for complete search history.

(56) References Cited

U.S. PATENT DOCUMENTS

| | | | |
|---|---|---|---|
| 2004/0155663 | A1 | 8/2004 | Knoedgen |
| 2007/0182248 | A1* | 8/2007 | Blaker et al. ................. 307/10.1 |
| 2010/0039046 | A1* | 2/2010 | Roebke ......................... 315/291 |
| 2012/0286661 | A1* | 11/2012 | Salter et al. .................... 315/77 |

OTHER PUBLICATIONS

European Search Report for Application Serial No. 13157947.6-1802. Mailed Jul. 18, 2013. 7 pages.

\* cited by examiner

*Primary Examiner* — Thuy Vinh Tran
(74) *Attorney, Agent, or Firm* — Cantor Colburn LLP

(57) ABSTRACT

A dimmable LED reading light unit according to exemplary embodiments of the invention, in particular for a passenger transportation vehicle, such as an airplane, a ship, a bus, or a railcar, comprises an input connectable to a potentiometer being supplied with a constant supply voltage and outputting a direct voltage having a voltage intensity corresponding to a selected dimming rate; an electronic measuring and control unit connected to at least one LED and providing an operating current to the at least one LED, and method of operating same.

12 Claims, 1 Drawing Sheet

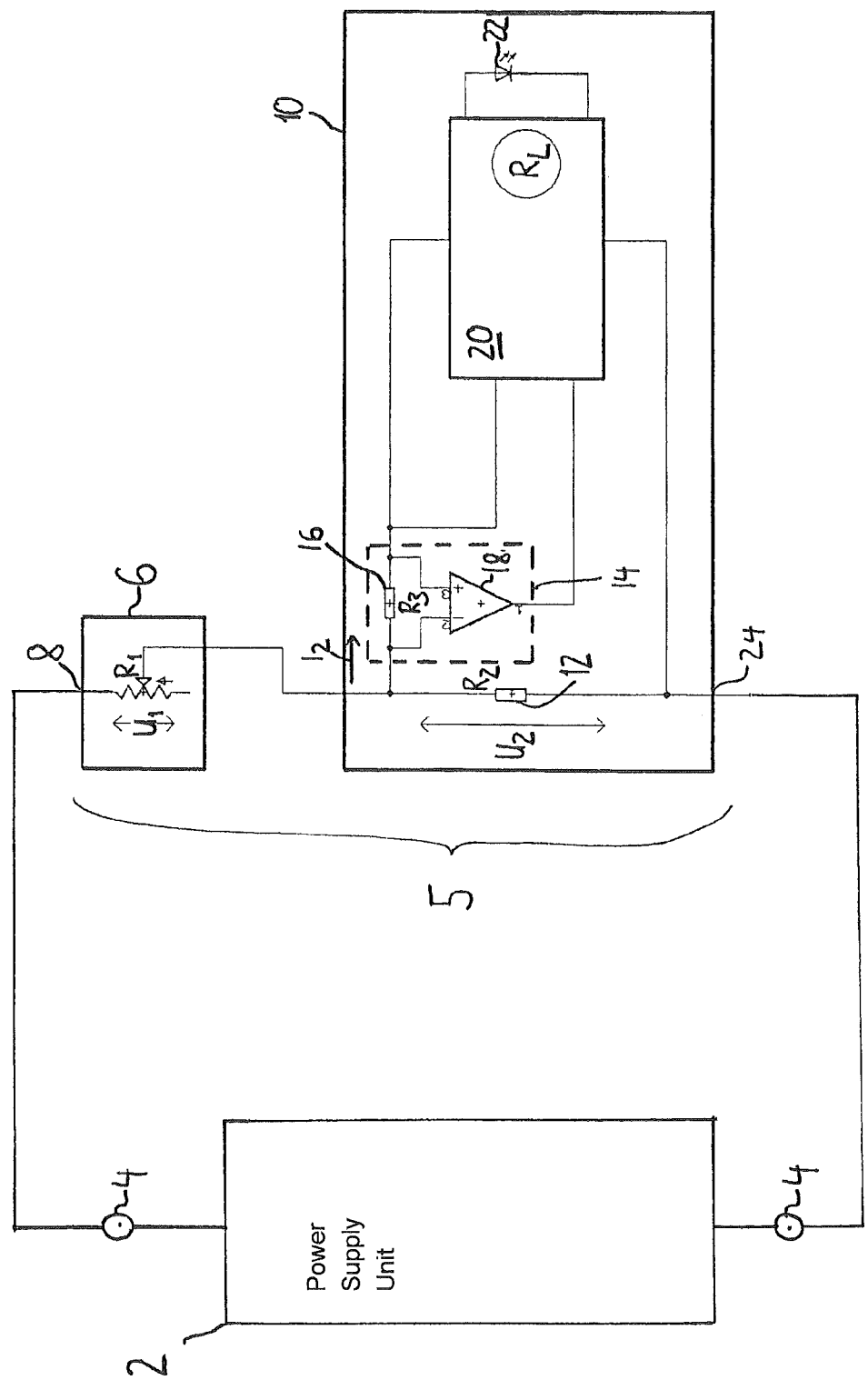

DIMMABLE LED READING LIGHT UNIT, ARRANGEMENT OF POWER SUPPLY AND DIMMABLE LED READING LIGHT UNIT, METHOD OF OPERATING A DIMMABLE LED READING LIGHT UNIT IN A POWER SUPPLY SYSTEM AND METHOD OF REPLACING A DIMMABLE LIGHT UNIT BY A DIMMABLE LED READING LIGHT UNIT

CROSS REFERENCE TO RELATED APPLICATIONS

This application claims priority to European Patent Application No. 13 157 947.6 filed Mar. 6, 2013, the entire contents of which is incorporated herein by reference.

BACKGROUND

The invention relates to interior lighting systems for a passenger transportation vehicle such as an airplane, a ship, a bus, or a railcar and, in particular a dimmable LED reading light unit for such passenger transportation vehicle.

In passenger transportation vehicles, such as an airplane, a ship, a bus, or a railcar, halogen lights have been used as reading lights or seat lights. Due to their limited light yield and their comparably high power consumption, there is a tendency of replacing existing halogen lights by modern LED lights that have a higher light yield and lower power consumption.

However, in many cases it is not possible to adapt the existing power supply units in such passenger transportation vehicles, for example in airplanes, to the changed needs of LEDs that a replacement of a halogen light by a LED light brings with it. Such adaptation would be costly and cumbersome.

Further, the functionality of the light to be capable of being dimmed in order to emit light with a selected light intensity must be maintained.

Accordingly, it would be beneficial to provide a dimmable LED reading light unit having a high efficiency and being capable of replacing a conventional light unit. Further, it would be beneficial to provide a corresponding reliable method of operating dimmable LED reading light unit. Moreover, it would be beneficial to facilitate the replacement of a conventional light unit by a dimmable LED reading light unit as much as possible while replacing as few parts as possible and without changing the power supply unit and existing wiring.

SUMMARY

Exemplary embodiments of the invention include a dimmable LED reading light unit, in particular for a passenger transportation vehicle, such as an airplane, a ship, a bus, or a railcar. The unit includes an input connectable to a potentiometer being supplied with a constant supply voltage and outputting a direct voltage having a voltage intensity corresponding to a selected dimming rate, an electronic measuring and control unit connected to at least one LED and providing an operating current to the at least one LED, a resistor having a predetermined resistance value, and an output connectable to a ground line. The electronic measuring and control unit and the resistor are connected in parallel. The electronic measuring and control unit is configured to: measure the partial voltage applied to it and the partial load current flowing through it; determine the resistance value of the electronic measuring and control unit based on the measured partial voltage and based on the measured partial load current; determine the equivalent resistance value of the electronic measuring and control unit and of the resistor based on the predetermined resistance value of the resistor and based on the determined resistance value of the electronic measuring and control unit; determine the resistance value of the potentiometer based on the equivalent resistance value of the electronic measuring and control unit and of the resistor, based on the measured partial voltage and based on the constant voltage supplied to the potentiometer; determine the dimming rate of the potentiometer based on the determined resistance value of the potentiometer and based on the predetermined nominal resistance value of the potentiometer; and supply driving current to the at least one LED necessary to emit light with a luminous flux corresponding to the dimming rate of the potentiometer.

Further exemplary embodiments of the invention further include a dimmable LED reading light unit, in particular for a passenger transportation vehicle, such as an airplane, a ship, a bus, or a railcar. The unit includes an input connectable to a potentiometer being supplied with a constant supply voltage and outputting a direct voltage having a voltage intensity corresponding to a selected dimming rate, an electronic measuring and control unit connected to at least one LED and providing an operating current to the at least one LED, a resistor having a predetermined resistance value, an output connectable to a ground line. The electronic measuring and control unit and the resistor are connected in parallel. The electronic measuring and control unit is configured to: measure the partial voltage applied to it and determine the equivalent resistance value of the electronic measuring and control unit and of the resistor based on the predetermined resistance value of the resistor and based on a predetermined resistance value of the electronic measuring and control unit, and to determine the resistance value of the potentiometer based on the determined equivalent resistance value of the electronic measuring and control unit and of the resistor, based on the measured partial voltage and based on the constant voltage supplied to the potentiometer; or determine the resistance value of the potentiometer based on the predetermined resistance value of the resistor, based on the measured partial voltage and based on the constant voltage supplied to the potentiometer; and determine the dimming rate of the potentiometer based on the determined resistance value of the potentiometer and based on the predetermined nominal resistance value of the potentiometer; and supply driving current to the at least one LED necessary to emit light with a luminous flux corresponding to the dimming rate of the potentiometer.

Further exemplary embodiments of the invention further include a method of operating a dimmable LED reading light unit in a power supply system, in particular of a passenger transportation vehicle, such as an airplane, a ship, a bus, or a railcar, comprising the steps of: (a) supplying a potentiometer with a constant supply voltage; (b) selecting, by the potentiometer, a dimming rate such that an electronic measuring and control unit connected to at least one LED and providing an operating current to the at least one LED, and a resistor having a predetermined resistance value connected in parallel to the electronic measuring and control unit are supplied with a partial voltage having a voltage intensity corresponding to the selected dimming rate; (c) measuring, by the electronic measuring and control unit, the partial voltage applied to it and the partial load current flowing through it; (d) determining, by the electronic measuring and control unit, the resistance value of the electronic measuring and control unit based on the measured partial voltage and based on the measured partial load current; (e) determining, by the electronic measuring and control unit, the equivalent resistance value of the electronic measuring and control unit and of the resistor based on the predetermined resistance value of the resistor and based on the determined resistance value of the electronic measuring and control unit; (f) determining, by the electronic measuring and control unit, the resistance value of the potentiometer based on the equivalent resistance value of the electronic measuring and control unit and of the resistor, based on the measured partial voltage and based on the constant voltage supplied to the potentiometer; (g) determining, by the electronic measuring and control unit, the dimming rate of the potentiometer based on the determined resistance value of the potentiometer and based on the predetermined nominal resistance value of the potentiometer; and (h) supplying, by the electronic measuring and control unit, driving current to the at least one LED necessary to emit light with a luminous flux corresponding to the dimming rate of the potentiometer.

The dimmable LED reading light unit, according to exemplary embodiments of the invention, has a higher light yield and requires less electrical power as compared to conventional halogen light units. Furthermore, the dimmable LED reading light unit requires only very little maintenance since its elements normally have a long lifetime. Therefore, significant costs savings in the operation and the maintenance of the dimmable LED reading light unit can be realized.

By the dimmable LED reading light unit, according to exemplary embodiments of the invention, existing light units, particularly existing halogen light units can be replaced quickly, easily and reliably without having to change the wiring of the system and without having to change the potentiometer. The potentiometer can be kept and used for dimming the LED reading light unit which increases the cost savings and reduces the effort and costs associated with the replacement.

The dimmable LED reading light unit can be operated and dimmed reliably by using only one wire, namely the line coming from the potentiometer output supplying direct voltage and the ground line.

Moreover, the power supply that normally supplies a constant voltage of at least 20 VDC, for example 28 VDC can be used and the entire dimming range of the potentiometer between 0%, corresponding to an off state of the LED(s) and to the nominal resistance value of the potentiometer, and 100%, corresponding to the full luminous flux of the LED(s) and to a minimum resistance value of the potentiometer, can be used.

By a dimmable LED reading light unit which can also be called dimmable LED seat light unit, also dimmable LED light units are to be understood that emit light with an intensity of illumination suitable for reading, no matter if such dimmable LED light units are in fact used for reading.

In order to evaluate the position of the external potentiometer, the principle of a loaded voltage divider is used. The load of this voltage divider varies, depending on the power consumption of the electronic measuring and control unit to which the at least one LED is connected, and depending on the selecting dimming rate.

According to one embodiment (first variant), the power consumption of the loaded voltage divider can be monitored by measuring the partial voltage U2 and the partial current I2 of the electronic measuring and control unit. The resistance value and therefore the position of the external potentiometer R1 can be calculated using these measured values, the known resistance of the resistor R2 and the constant voltage supplied to the potentiometer. When measuring the partial current I2 and using the same to determine the resistance value of an electronic measuring and control unit and also the equivalent resistance value of the electronic measuring and control unit and of the resistor, a very precise determination of the dimming rate of the potentiometer can be achieved.

According to another embodiment (second variant), the power consumption of the loaded voltage divider can be monitored by measuring the partial voltage U2 of the electronic measuring and control unit to which the at least one LED is connected.

According to a first subvariant of the second variant, the resistance value R1 and thus the position of the external potentiometer can be calculated by determining the equivalent resistance value R2//RL of the electronic measuring and control unit and of the resistor based on the predetermined resistance value R2 of the resistor and based on an predetermined resistance value of the electronic measuring and control unit, and by determining the resistance value R1 of the potentiometer based on the determined equivalent resistance value R2//RL of the electronic measuring and control unit and of the resistor, based on the measured partial voltage U2 and based on the constant voltage VDD supplied to the potentiometer.

According to a second subvariant of the second variant, the resistance value R1 and thus the position of the external potentiometer can be determined based on the predetermined resistance value R2 of the resistor, based on the measured partial voltage U2 and based on the constant voltage VDD supplied to the potentiometer.

In both variants, the following formula can be used for calculating the equivalent resistance value of the electronic measuring and control unit and of the resistor connected in parallel.

$$R_2 // R_L = \frac{R_2 * R_L}{R_2 + R_L} \tag{I}$$

In case both the partial current I2 and the partial voltage U2 are measured (variant 1), the following formula can be used:

$$R_2 // R_L = \frac{R_2 * \frac{U_2}{I_2}}{R_2 + \frac{U_2}{I_2}} \tag{II}$$

In both variants, the following formula (3) can be used for determining the resistance value of the potentiometer.

$$R_1 = \frac{R_2 // R_L * 28V}{U_2} - R_2 // R_L \tag{III}$$

In both variants, the formula dimming rate=determined resistance value/predetermined nominal resistance value can be used for determining the dimming rate of the potentiometer.

According to a first embodiment of both variants, the measurement, the determination and the driving current supply can be performed in a continuous manner in order to adjust the driving current to the at least one LED in response to changes in the dimming rate of the potentiometer. In case of the variant 1, such continuous and repeated performance of the measurement, the determination and the driving current supply ensures that changes in the equivalent resistance value of the electronic measuring and control unit and of the resistor, for example following a change in the supply driving current to the at least one LED, are reflected by an appropriately control of the supply driving current to the at least one LED.

In an embodiment relevant to the variant 1, the electronic measuring and control unit can comprise a resistor arranged in the line leading to the electronic measuring and current control unit; a computing amplifier with a first input being connected to a line branching off from the line leading to the electronic measuring and current control unit at a position before the resistor, and with a second input being connected to a line branching off from the line leading to the electronic measuring and current control unit at a position behind the resistor; the computing amplifier being configured for amplifying the difference between the voltages at its two inputs and for enabling the electronic measuring and current control unit to measure the partial current flowing through it.

According to a further embodiment applicable for both variants, the electronic measuring and control unit is configured to supply—upon measurement of a partial voltage applied to the electronic measuring and control unit—driving current to the at least one LED necessary to emit light with a luminous flux corresponding to a reference dimming rate of the potentiometer, wherein a set of reference dimming rates of the potentiometer associated with respective partial voltage values is stored in the electronic measuring and control unit.

By such reference dimming rates of the potentiometer associated with respective partial voltages, the load of the electronic measuring and control unit can be controlled quickly to a current load being already close to the precise driving current to the at least one LED needed. Using such reference resistance values provides a better start for calculation and ensures that the precise resistance value, the precise dimming rate of the potentiometer and the precise load current can be determined quickly without a long control time, and the changing load current of the electronic measuring and control unit is taken into account.

In an embodiment applicable to both variants, further a line branching off from the line leading to the electronic measuring and current control unit and leading to the electronic measuring and current control unit can be provided that enables the electronic measuring and current control unit to measure the actual partial voltage U2.

In order to provide the desired full brightness according to specifications given, two or more LEDs can be connected to the electronic measuring and control unit.

According to a further embodiment, the electronic measuring and control unit is configured to supply driving current to the at least one LED necessary to emit light with a luminous flux corresponding to the determined dimming rate of the potentiometer by pulse width modulation. In this embodiment, the intensity of the driving current does not have to be modified. Rather, the duty factor or in other words the ratio between the on times and off times is adapted such that the at least one LED emits light with a luminous flux corresponding to the determined dimming rate of the potentiometer.

According to an alternative embodiment, the electronic measuring and control unit is configured to supply the driving current to the at least one LED necessary to emit light with a luminous flux corresponding to the determined dimming rate of the potentiometer by supplying driving current with a current intensity corresponding to the determined dimming rate of the potentiometer. This is also called linear LED control.

According to a further embodiment the dimmable LED reading light unit further comprises a housing enclosing the elements of the dimmable LED reading light unit, particularly the electronic measuring and the resistor, and fastening the at least one LED.

According to a further embodiment the dimmable LED reading light unit also comprises the potentiometer having an input being connectible to a power supply unit supplying a substantially constant direct voltage. In this embodiment, the potentiometer is part of the dimmable LED reading light unit itself and can be also enclosed in the housing, if present. The potentiometer together dimmable LED reading light unit forms a loaded voltage divider.

According to a further embodiment applicable for both variants, typical resistance values R2 for the resistor may be 100-2000Ω, and more particularly 200-400Ω, typical voltage values for the power supply may be 12-28 VDC, and typical resistance values R1 for the potentiometer may be 50-200Ω, and more particularly 60-70Ω.

For the arrangement of a power supply and a dimmable LED reading light for use in a passenger transportation vehicle, according to exemplary embodiments of the invention, for the methods of operating a dimmable LED reading light unit in a power supply system, in particular of a passenger transportation vehicle, such as an airplane, a ship, a bus, or a railcar, and for the method of replacing a dimmable light unit in a power supply system by a dimmable LED reading light unit, according to exemplary embodiments of the invention, the same advantages and embodiments as explained with respect to the dimmable LED reading light unit apply, and they are herewith incorporated by reference without repeating them again for brevity.

In an embodiment of the methods of operating a dimmable LED reading light unit in a power supply system, particularly in both variants, the steps (b) to (g) can be repeated until there is no or no significant change in the driving current.

The invention also relates to a passenger transportation vehicle, such as an airplane, a ship, a bus, or a railcar, comprising a dimmable LED reading light unit as described herein or comprising an arrangement of a power supply and of a dimmable LED reading light unit as described herein. The same advantages and embodiments as explained with respect to the dimmable LED reading light unit and with respect to the arrangement of a power supply and of a dimmable LED reading light unit also apply for the whole passenger transportation vehicle, and they are herewith incorporated by reference without repeating them again for brevity.

BRIEF DESCRIPTION OF THE DRAWING

Embodiments of the invention are described in greater detail below with reference to the appended FIGURE, wherein:

The FIGURE is a schematic diagram of a power supply unit of an airplane and a dimmable LED reading light unit, according to an exemplary embodiment of the present invention.

DETAILED DESCRIPTION

The FIGURE shows, according to an exemplary embodiment of the present invention, a schematic diagram of a power supply unit 2 to which a potentiometer 6 and a dimmable LED reading light unit 10 are connected via power supply connections 4.

The power supply unit 2 provides a direct voltage, which is substantially constant and which can be for example 28 VDC, over the power supply connections 4.

In the present embodiment, for simplicity, only one reading light unit that is connected to the power supply unit 2 via the power supply connection 4 is shown. This reading light unit 5 is formed as a dimmable LED reading light unit 10 having a potentiometer 6 connected in series and in front thereof. The dimmable LED reading light unit 10 and the potentiometer 6 can for example be situated in the cockpit of an airplane.

Via the upper power supply connection 4, a substantially constant voltage of for example 28 VDC is supplied and the lower power supply connection 4 forms a ground line. In case of an airplane, an aircraft ground can be provided instead of the lower power supply connection 4 leading to the power supply unit 2. In such case only the upper power supply connection 4 leading to the potentiometer 6 is present.

In the FIGURE, a halogen light unit (not shown) has been replaced by the dimmable LED reading light unit 10, wherein the potentiometer 6 of the halogen light unit has not been replaced but rather kept and also the existing wiring has not been replaced but rather kept. This keeps the effort and costs for the replacement as low as possible, as the existing wiring and the existing potentiometer 6 can be used for operating and/or dimming the dimmable LED reading light unit 10.

For replacing the halogen light unit by the dimmable LED reading light unit 10, it is only required to connect the connection line coming from the output of the potentiometer 6 to the input of the dimmable LED reading light unit 10 and to connect the output 24 of the dimmable LED reading light unit 10 to the ground line 4, and no other changes in the wiring have to be made.

Due to their different characteristics, LED lights could not be dimmed by potentiometers connected in series thereof, until the present invention has been made.

The reading light unit 5 comprises an input 8 that is connected to the potentiometer 6. The dimmable LED reading light unit 10 comprises a resistor 12 and an electronic measuring and current control unit 20 connected in parallel, and an output 24 connected to the ground line 4.

The dimmable LED reading light unit 10 includes an electronic measuring and current control unit 20 and a current measurement preparation unit 14 that comprises a resistor 16 arranged in the line leading to the electronic measuring and current control unit 20 and a computing amplifier 18 having two inputs and one output. The first input is connected to a line branching off from the line leading to the electronic measuring and current control unit 20 at a position before the resistor 16, the second input is connected to a line branching off from the line leading to the electronic measuring and current control unit 20 at a position behind the resistor 16, and the output is connected to the electronic measuring and current control unit 20. The current measurement preparation unit 14 amplifies the difference between the voltages at their two inputs and outputs the same via its output. This enables the electronic measuring and current control unit 20 to measure the actual partial current I2. The resistor 16 can also be called shunt for current measurement. Such current measurement is known to the skilled person and does not need to be explained in further detail here.

Further, a line branching off from the line leading to the electronic measuring and current control unit 20 is provided that connects to the electronic measuring and current control unit 20, which line enables the electronic measuring and current control unit 20 to measure the partial voltage U2.

Further at least one LED 22 is provided, connected to the electronic measuring and current control unit 20. In the exemplary embodiment of the FIGURE one such LEDs 22 is connected to the electronic measuring and current control unit 20, however, as a matter of course also Two or more LEDs can be connected in series to the electronic measuring and current control unit 20.

The electronic measuring and current control unit 20 determines, as will be explained in detail below, the driving current necessary for the LEDs 22 to emit light with the luminous flux corresponding to the dimming rate selected at the potentiometer 6, for example by a passenger, a cabin attendant or a pilot, and supplies such driving current to the LED 22.

The potentiometer 6 and the dimmable LED reading light unit 10 form a loaded voltage divider 5, the load of which however varies, depending on the power consumption of the electronic measuring and current control unit 20, including the current measurement preparation unit 14 and the LED 22, and depending on the dimming rate selected at the potentiometer 6.

In the following, the operation of the potentiometer 6 and the dimmable LED reading light unit 10 is described for a number of exemplary operating conditions.

R1 designates the actual resistance value of the potentiometer 6 being proportional to the selected dimming weight, and U1 designates the corresponding voltage drop at the potentiometer 6. U2 designates the partial voltage drop over the resistor I2 and, respectively, the electronic measuring and current control unit 20 including the current measurement preparation unit 14 and the LED 22. R2 indicates the resistance value of the resistor I2. I2 designates the partial current flowing through the electronic measuring and current control unit 20 including the current measurement preparation unit 14 and the LED 22. RL indicates the resistance value of the electronic measuring and current control unit 20.

The equivalent resistance R2//RL of R2 and RL connected in parallel can be calculated as follows:

$$R_2 // R_L = \frac{R_2 * R_L}{R_2 + R_L} \qquad (1) = (I)$$

If RL is replaced by RL=U2/I2, this formula can be converted as follows:

$$R_2 // R_L = \frac{R_2 * \frac{U_2}{I_2}}{R_2 + \frac{U_2}{I_2}} \qquad (2) = (II)$$

The rule of the voltage divider is as follows:

$$\frac{U_{partial}}{U_{total}} = \frac{R_{partial}}{R_{total}} \qquad (3)$$

With the total voltage of 28 Volt being inserted into this formula:

$$\frac{U_2}{28V} = \frac{R_2 // R_L}{R_{total}} \qquad (4)$$

With the total resistance being the sum of R1 plus equivalent resistance R2//RL, this formula can be converted into:

$$\frac{U_2}{28V} = \frac{R_2 // R_L}{R_1 + R_2 // R_L} \quad (5)$$

This formula can be solved for R1 as follows:

$$R_1 + R_2 // R_L = \frac{R_2 // R_L * 28V}{U_2} \quad (6)$$

$$R_1 = \frac{R_2 // R_L * 28V}{U_2} - R_2 // R_L \quad (7) = (III)$$

In the following exemplary calculations, the following values are known to the electronic measuring and current control unit 20. The resistance value R1 of the potentiometer 6 corresponding to a 100% dimming rate selected at the potentiometer 6 corresponding to full brightness of the LED 22 is known to be R1=0Ω, and the resistance value of the potentiometer 6 corresponding to a selected dimming rate of 0% (off-state of the LED 22) is known to be U1=68Ω. Further, the direct voltage UVDD, that is substantially constant over time, applied by the power supply unit 2 is known to be 28 VDC and the resistance value R2 of the resistor I2 is known to be R2=220Ω. The nominal forward voltage Vf of the LED 22 is 3.3 V corresponding to a nominal driving current of If=100 mA and the efficiency factor of 90% of the LED 22 are also known.

The power consumption of the electronic measuring and current control unit 20 and the LED 22, when the electronic measuring and current control unit 20 supplies a nominal driving current of If=100 mA and a corresponding nominal forward voltage of Vf=3.3 V to the LED 22 (corresponding to full brightness/luminous flux corresponding to the 100% dimming rate of the potentiometer 6), considering an efficiency factor of 90% of the LED driver circuit, can be calculated as follows:

$$P = \frac{3.3V * 100 \text{ mA}}{90\%} = 367 \text{ mW}$$

This power consumption is also known to the electronic measuring and current control unit 20.

In a first example of calculation, the partial voltage U2 measured by the electronic measuring and current control unit 20 is: U2=28V. This means that there is no voltage drop at the potentiometer 6 and, consequently, the potentiometer 6 is in the 100% position corresponding to its resistance value of R1=0Ω. In this example, the electronic measuring and control unit 20 supplies driving current to the LED 22 necessary to emit light with a luminous flux corresponding to the 100% dimming rate of the potentiometer 6, namely a driving current of If=100 mA and a forward voltage of Vf=3.3 V.

The load current of the entire voltage divider 5 in this case can be calculated as follows:

I=P/U=367 mW/28 V=13 mA.

If the electronic measuring and current control unit 20 is configured to measure this load current, I2 that corresponds to I in this example, can also be measured.

The resistance value R1 of the electronic measuring and control unit 20 is:

$R_L$=28 V/13 mA=2.14 kΩ, and the equivalent resistance value $R_2//R_L$ can be calculated using formula (2):

$R_2//R_L$=199 Ω.

According to a further example of calculation, the potentiometer 6 is now changed roughly into the direction of its 50% dimming position.

In the present example, the partial voltage U2 measured by the electronic measuring and control unit 20 will sink down to 23.9 V, due to a voltage drop of U1=UVDD−U2=4.1 V at the potentiometer 6.

This voltage drop can be associated in the electronic measuring and control unit 20 to a reference resistance value of R1=34Ω corresponding to a dimming rate of 50% of the potentiometer 6, if reference resistance values of the potentiometer 6 associated to measured partial voltage values U2 are stored there. Such reference resistance values provide a better start for calculation and ensure that the precise resistance value and the precise dimming rate of the potentiometer 6 can be determined quickly taking into account the accordingly changing load current of the electronic measuring and control unit 20.

With such reference resistance value of R1=34Ω of the potentiometer 6 the dimming rate of the potentiometer 6 can be calculated on a preliminary basis to 34Ω/68Ω=50%.

Therefore, the electronic measuring and control unit 20 will reduce the driving current to the LED 22 such that its luminous flux/brightness sinks down to 50%, and when doing so, also the load current I2 of the voltage divider 5 sinks:

P=367 mW 50%=184 mW $I_2$=184 mW/23.9 V=7.7 mA

This load current I2 can be calculated or, in the alternative, measured by the electronic measuring and control unit 20.

The resistance value R1 in this case is R1=23.9 V/7.7 mA=3.103 kΩ, and the equivalent resistance R2//R1 can be calculated using formula (2) to R2//R1=205Ω. Then, the precise value of R1 can be calculated to:

$$R_1 = \frac{205\Omega * 28V}{23.9V} - 205\Omega = 35\Omega$$

using formula (7). This corresponds to a position of the potentiometer 6 of 35Ω/68Ω=51.5%. This is the precise dimming position of the potentiometer 6, and the electronic measuring and control unit 20 will slightly increase the driving current to the LED 22 such that its luminous flux/brightness corresponds to 51.5%.

According to a further example calculation, the potentiometer 6 is further moved into the direction of 0% brightness, hence to its 0% dimming position, corresponding to a resistance value of R1=68Ω. The measured partial voltage U2—due to the voltage drop of about 7.0 V at the potentiometer 6—will sink down to 21.0 V. This voltage drop can be associated in the electronic measuring and control unit 20 to a reference resistance value of R1=68Ω corresponding to a dimming rate of 0% of the potentiometer 6, if reference resistance values of the potentiometer 6 associated to measured partial voltage values U2 are stored there.

According to this example of calculation, the LED 22 which had been emitting light with a 51.5% brightness/luminous flux corresponding to the equivalent resistance of R2//RL=205Ω, is controlled such that its luminous flux/brightness sinks down to 0%.

Subsequently, the electronic measuring and control unit 20 will reduce/control down the driving current to the LED 22 such that its luminous flux/brightness corresponds to 0%, therefore the unit 5 is no more under load, consequently the LED 22 is switched off and the partial resistance value RL goes to infinity.

$$R_1 = \frac{205\Omega * 28V}{21.0} - 205\Omega = 68\Omega$$

After having switched off the LED 22, there is no current load in the electronic measuring and control unit 20 anymore, and the partial voltage U2 will increase a little to 21.4 V such that:

$$R_1 = \frac{220\Omega * 28V}{21.4V} - 220\Omega = 68\Omega$$

In has to be noted, that a change in the luminous flux/brightness of the LED 22 by the electronic measuring and control unit 20 always causes a change in the ratio of U1 and U2.

The electronic measuring and control unit 20 can determine the resistance value R1 according to formula (7) as above based on the knowledge of the maximum resistance value R1 corresponding to a 0% position of the potentiometer 6, based on the knowledge of the resistance value U2, based on the knowledge of the constant voltage VDCC supplied to the potentiometer 6 by the power supply unit 2, and based on the measurements of I2 and U2.

Based on the actual resistance value R1 determined in this manner and based on the maximum resistance value R1 of the potentiometer 6, the dimming rate selected can also be determined, and the electronic measuring and current control unit can supply driving current to the LED 22 necessary to emit light with the luminous flux corresponding to such dimming rate.

If the resistor I2 has a small resistance value of for example of 200Ω or less, this will cause significant voltage differences when changing the position of the potentiometer 6, and a small influence of the load of the electronic measuring and current control unit 20.

In one aspect of the exemplary embodiments of the invention, the load of the electronic measuring and current control unit 20 does not necessarily has to be taken into account and the measurement of I2 can be omitted.

In such embodiment, where the load of the electronic measuring and current control unit 20 is not taken into account and where I2 is not measured, the dimmable LED reading light unit corresponds to the dimmable LED reading light unit 10, but the current measurement unit 14 does not have to present and can be omitted.

An exemplary calculation for such embodiment is as follows:

The following values are known to the electronic measuring and current control unit 20. Further the resistance value R1 of the potentiometer 6 corresponding to a 100% dimming rate selected at the potentiometer 6 corresponding to full brightness of the LED 22 is known to be R1=0Ω, and the resistance value of the potentiometer 6 corresponding to a selected dimming rate of 0% (off-state of the LED 22) is known to be U1=68Ω. From this, the resistance value R1=34Ω of the potentiometer 6 can be associated to a selected dimming rate of 50%.

Further, the direct voltage UVDD, that is substantially constant over time, applied by the power supply unit 2 is known to be 28 VDC and the resistance value R2 of the resistor I2 is known to be R2=220Ω. The nominal forward voltage Vf of the LED 22 is 3.3 Volt corresponding to a nominal driving current of If=100 mA and the efficiency factor of 90% of the LED 22 due to the LED control circuit are also known.

The power consumption of the electronic measuring and current control unit 20 and the LED 22, when the electronic measuring and current control unit 20 supplies a nominal driving current of If=100 mA and a corresponding nominal forward voltage of Vf=3.3 V to the LED 22 (corresponding to full brightness/luminous flux corresponding to the 100% dimming rate of the potentiometer 6), considering an efficiency factor of 90% of the LED driver circuit, can be calculated as follows:

$$P = \frac{3.3V * 100 \text{ mA}}{90\%} = 367 \text{ mW}$$

Upon measurement of U2=23.9 V by the electronic measuring and current control unit 20, the resistance value R1 of the potentiometer 6 can be calculated as follows:

$$R_1 = \frac{R_2 * 28V}{U_2} - R_2$$

$$R_1 = \frac{220\Omega * 28V}{23.9V} - 220\Omega = 37.7\Omega$$

This corresponds to a position of the potentiometer 6 of 37.7Ω/68Ω=55.4%. This is the rough position of the potentiometer 6, determined without measuring I2, and the electronic measuring and control unit 20 will adjust the driving current to the LED 22 such that its luminous flux/brightness corresponds to 55.4%.

For comparison, in an alternative embodiment, the position of the potentiometer 6 is determined by measuring I2 and by determining the equivalent resistance value R2//RL, as described above.

Upon measurement of U2=23.9 V and I2=7.7 mA by the electronic measuring and current control unit 20, the resistance value RL of the electronic measuring and control unit 20 can be calculated to be:

$R_L$=23.9 V/7.7 mA=3.103 kΩ, and the equivalent resistance value $R_2//R_L$ can be calculated to be:

$R_2//R_L$=220Ω in parallel to 3.103 kΩ=199Ω.

The resistance value R1 of the potentiometer 6 can be calculated as follows:

$$R_1 = \frac{R_2 // R_L * 28V}{U_2} - R_2 // R_L$$

$$R_1 = \frac{199\Omega * 28V}{23.9V} - 199\Omega = 34\Omega$$

This corresponds to a position of the potentiometer 6 of 34Ω/68Ω=50%. This is the precise position of the potentiometer 6, determined by measuring I2, and by determining the equivalent resistance value R2//RL. The electronic measuring and control unit 20 will adjust the driving current to the LED 22 such that its luminous flux/brightness corresponds to 50%.

Typical resistance values for the resistor I2 may be 100-2000Ω, and more particularly 200-400Ω. Smaller values are less suitable, since the resistance value of the potentiometer can go to 0Ω and the voltage applied to both the potentiometer 6 and the electronic measuring and control unit 20 normally is 28 VDC.

If the resistor 12 has a small resistance value of 200Ω or less, a cross-current flows through the voltage divider 5 and there is a non-utilized power consumption, that generates heat. Since according to exemplary embodiments of the invention however, the dimmable LED reading light unit replaces a halogen light unit, such non-utilized power consumption is—due to the LED technology used—still significantly smaller than with a halogen light unit.

While the invention has been described with reference to exemplary embodiments, it will be understood by those skilled in the art that various changes may be made and equivalence may be substituted for elements thereof without departing from the scope of invention. In addition, many modifications may be made to adapt a particular situation or material to the teachings of the invention without departing from the essential scope thereof. Therefore, it is intended that the invention not be limited to the particular embodiment disclosed, but that the invention will include all the embodiments falling within the scope of the appended claims.

The invention claimed is:

1. A dimmable LED reading light unit, in particular for a passenger transportation vehicle, comprising:
   an input connected to a potentiometer being supplied with a constant supply voltage and outputting a direct voltage having a voltage intensity corresponding to a selected dimming rate;
   an electronic measuring and control unit connected to at least one LED and providing an operating current to the at least one LED;
   a resistor having a predetermined resistance value; and
   an output connected to a ground line;
   the electronic measuring and control unit and the resistor being connected in parallel;
   wherein the electronic measuring and control unit is configured to:
   measure a partial voltage applied to it and a partial load current flowing through it;
   determine a resistance value of the electronic measuring and control unit based on the measured partial voltage and based on the measured partial load current;
   determine a equivalent resistance value of the electronic measuring and control unit and of the resistor based on the predetermined resistance value of the resistor and based on the determined resistance value of the electronic measuring and control unit;
   determine a resistance value of the potentiometer based on the equivalent resistance value of the electronic measuring and control unit and of the resistor, based on the measured partial voltage and based on the constant voltage supplied to the potentiometer;
   determine a dimming rate of the potentiometer based on the determined resistance value of the potentiometer and based on the predetermined nominal resistance value of the potentiometer; and
   supply driving current to the at least one LED necessary to emit light with a luminous flux corresponding to the dimming rate of the potentiometer.

2. The dimmable LED reading light unit according to claim 1, wherein the electronic measuring and control unit is configured to:
   measure the partial voltage applied to it and the partial load current flowing through it;
   determine the resistance value of the electronic measuring and control unit based on the measured partial voltage and based on the measured partial load current;
   determine the equivalent resistance value of the electronic measuring and control unit and of the resistor based on the predetermined resistance value of the resistor and based on the determined resistance value of the electronic measuring and control unit;
   determine the resistance value of the potentiometer based on the equivalent resistance value of the electronic measuring and control unit and of the resistor, based on the measured partial voltage and based on the constant voltage supplied to the potentiometer;
   determine the dimming rate of the potentiometer based on the determined resistance value of the potentiometer and based on the predetermined nominal resistance value of the potentiometer; and
   supply driving current to the at least one LED necessary to emit light with a luminous flux corresponding to the dimming rate of the potentiometer in a continuous manner in order to adjust the driving current to the at least one LED taking into account both changes in the dimming rate of the potentiometer and changes in the equivalent resistance value of the electronic measuring and control unit and of the resistor.

3. The dimmable LED reading light unit according to claim 1, wherein the electronic measuring and control unit comprises:
   a resistor arranged in the line leading to the electronic measuring and current control unit;
   a computing amplifier with a first input being connected to a line branching off from the line leading to the electronic measuring and current control unit at a position before the resistor, and with a second input being connected to a line branching off from the line leading to the electronic measuring and current control unit at a position behind the resistor; wherein
   the computing amplifier being configured for amplifying the difference between the voltages at its two inputs and for enabling the electronic measuring and current control unit to measure the partial current flowing through it.

4. A dimmable LED reading light unit, in particular for a passenger transportation vehicle, comprising:
   an input connected to a potentiometer being supplied with a constant supply voltage and outputting a direct voltage having a voltage intensity corresponding to a selected dimming rate;
   an electronic measuring and control unit connected to at least one LED and providing an operating current to the at least one LED;
   a resistor having a predetermined resistance value; and
   an output connected to a ground line;
   the electronic measuring and control unit and the resistor being connected in parallel;
   wherein the electronic measuring and control unit is configured to:
   measure a partial voltage applied to it; and
   determine an equivalent resistance value of the electronic measuring and control unit and of the resistor based on the predetermined resistance value of the resistor and based on a predetermined resistance value of the electronic measuring and control unit, and determine a resistance value of the potentiometer based on the determined equivalent resistance value of the electronic measuring and control unit and of the resistor, based on the measured partial voltage and based on the constant voltage supplied to the potentiometer; or determine a resistance value of the potentiometer based on the predetermined resistance value of the resistor, based on the measured partial voltage and based on the constant voltage supplied to the potentiometer; and determine a dimming rate of the potentiometer based on the determined resistance value of the potentiometer and based on the predetermined nominal resistance value of the potentiometer; and supply driving current to the at least one LED necessary to emit light with a luminous flux corresponding to the dimming rate of the potentiometer.

5. The dimmable LED reading light unit according to claim 4, wherein the electronic measuring and control unit is configured to:

measure the partial voltage applied to it;

determine the equivalent resistance value of the electronic measuring and control unit and of the resistor based on the predetermined resistance value of the resistor and based on a predetermined resistance value of the electronic measuring and control unit;

determine the resistance value of the potentiometer based on the determined equivalent resistance value of the electronic measuring and control unit and of the resistor, based on the measured partial voltage and based on the constant voltage supplied to the potentiometer;

determine the dimming rate of the potentiometer based on the determined resistance value of the potentiometer and based on the predetermined nominal resistance value of the potentiometer; and supply driving current to the at least one LED necessary to emit light with a luminous flux corresponding to the dimming rate of the potentiometer in a continuous manner in order to adjust the driving current to the at least one LED taking into account changes in the dimming rate of the potentiometer.

6. The dimmable LED reading light unit according to claim 4, wherein the electronic measuring and control unit is configured to supply—upon measurement of a partial voltage applied to the electronic measuring and control unit—driving current to the at least one LED necessary to emit light with a luminous flux corresponding to a reference dimming rate of the potentiometer, wherein a set of reference dimming rates of the potentiometer associated with respective partial voltage values is stored in the electronic measuring and control unit.

7. The dimmable LED reading light unit according to claim 4, further comprising a line branching off from the line leading to the electronic measuring and current control unit and leading to the electronic measuring and current control unit in order to enable the electronic measuring and current control unit to measure the actual partial voltage.

8. The dimmable LED reading light unit according to claim 4, wherein the at least one LED comprises two or more LEDs connected to the electronic measuring and control unit in series.

9. The dimmable LED reading light unit according to claim 4, wherein the electronic measuring and control unit is configured to supply the driving current to the at least one LED necessary to emit light with a luminous flux corresponding to the determined dimming rate of the potentiometer, by pulse width modulation.

10. The dimmable LED reading light unit according to claim 4, wherein the electronic measuring and control unit is configured to supply the driving current to the at least one LED necessary to emit light with a luminous flux corresponding to the determined dimming rate of the potentiometer, by supplying driving current with a current intensity corresponding to the determined dimming rate of the potentiometer.

11. The dimmable LED reading light unit according to claim 4, further comprising the potentiometer, wherein the potentiometer and the electronic measuring and control unit with the resistor connected in parallel form a voltage divider.

12. A method of operating a dimmable LED reading light unit in a power supply system, in particular of a passenger transportation vehicle, comprising the steps of:

(a) supplying a potentiometer with a constant supply voltage;

(b) selecting, by the potentiometer, a dimming rate such that an electronic measuring and control unit connected to at least one LED and providing an operating current to the at least one LED, and a resistor having a predetermined resistance value connected in parallel to the electronic measuring and control unit are supplied with a partial voltage having a voltage intensity corresponding to the selected dimming rate;

(c) measuring, by the electronic measuring and control unit, a partial voltage applied to it and a partial load current flowing through it;

(d) determining, by the electronic measuring and control unit, a resistance value of the electronic measuring and control unit based on the measured partial voltage and based on the measured partial load current;

(e) determining, by the electronic measuring and control unit, a equivalent resistance value of the electronic measuring and control unit and of the resistor based on the predetermined resistance value of the resistor and based on the determined resistance value of the electronic measuring and control unit;

(f) determining, by the electronic measuring and control unit, a resistance value of the potentiometer based on the equivalent resistance value of the electronic measuring and control unit and of the resistor, based on the measured partial voltage and based on the constant voltage supplied to the potentiometer;

(g) determining, by the electronic measuring and control unit, the dimming rate of the potentiometer based on the determined resistance value of the potentiometer and based on the predetermined nominal resistance value of the potentiometer; and (h) supplying, by the electronic measuring and control unit, driving current to the at least one LED necessary to emit light with a luminous flux corresponding to the dimming rate of the potentiometer.

* * * * *